(12) United States Patent
Ma et al.

(10) Patent No.: US 11,388,376 B2
(45) Date of Patent: Jul. 12, 2022

(54) DISPLAY DEVICE AND DISPLAY CONTROL METHOD

(71) Applicant: BOE Technology Group Co., Ltd., Beijing (CN)

(72) Inventors: Sen Ma, Beijing (CN); Naifu Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 464 days.

(21) Appl. No.: 16/473,457

(22) PCT Filed: Jan. 3, 2019

(86) PCT No.: PCT/CN2019/070199
§ 371 (c)(1),
(2) Date: Jun. 25, 2019

(87) PCT Pub. No.: WO2019/192230
PCT Pub. Date: Oct. 10, 2019

(65) Prior Publication Data
US 2021/0360209 A1    Nov. 18, 2021

(30) Foreign Application Priority Data

Apr. 3, 2018    (CN) .......................... 201810293673.9

(51) Int. Cl.
*H04N 9/31* (2006.01)
*B60K 35/00* (2006.01)

(52) U.S. Cl.
CPC ........... *H04N 9/3152* (2013.01); *B60K 35/00* (2013.01); *H04N 9/312* (2013.01); *H04N 9/3161* (2013.01);
(Continued)

(58) Field of Classification Search
CPC ...... H04N 9/312; H04N 9/315; H04N 9/3123; H04N 9/3132; H04N 9/3141;
(Continued)

(56) References Cited

U.S. PATENT DOCUMENTS 8,867,138 B2    10/2014  Kobayashi
9,746,668 B2    8/2017   Kim et al.
(Continued)

FOREIGN PATENT DOCUMENTS

CN    104039578 A    9/2014
CN    104777614 A    7/2015
(Continued)

OTHER PUBLICATIONS

International Search Report and Written Opinion dated Mar. 14, 2019, for corresponding PCT Application No. PCT/CN2019/070199.
(Continued)

*Primary Examiner* — Sultan Chowdhury
(74) *Attorney, Agent, or Firm* — Kinney & Lange, P.A.

(57) ABSTRACT

A display device is provided, including: a reflective screen; and a display assembly comprising: a light source; a light modulator provided in a direction of propagation of the light beams and a reflective display located downstream the light modulator in an optical path of the display device, the light modulator is configured to modulate the light beams alternately at two different deflection angles, and the reflective display is configured to generate a first image in response to the light beam in a first direction and a second image in response to the light beam in a second direction; and a relay optical device located downstream the reflective display in the optical path of the display device and configured to project the light beam carried with the first image and the
(Continued)

beam carried with the second image onto two different positions on the reflective screen.

20 Claims, 3 Drawing Sheets

(52) U.S. Cl.
CPC ... *H04N 9/3164* (2013.01); *B60K 2370/1529* (2019.05); *B60K 2370/52* (2019.05)

(58) Field of Classification Search
CPC .. H04N 9/3152; H04N 9/3155; H04N 9/3161; H04N 9/3164; G03B 21/008; G03B 21/28; G03B 21/145; G03B 21/2013; G03B 21/2033; G03B 21/2053; B60K 2370/52; B60K 2370/334; B60K 2370/1529; B60K 35/00; G02B 27/01; G02B 27/0101; G02B 27/0172; G02B 27/283; G02B 27/425; G02B 27/1033
See application file for complete search history.

(56) References Cited

U.S. PATENT DOCUMENTS

| | | | |
|---|---|---|---|
| 2013/0021224 A1* | 1/2013 | Fujikawa | G02B 27/0101 345/7 |
| 2013/0242404 A1 | 9/2013 | Kobayashi | |
| 2015/0062345 A1* | 3/2015 | Kusanagi | G02B 27/01 348/162 |
| 2015/0366460 A1* | 12/2015 | Ohkoba | A61B 5/0095 600/407 |
| 2016/0316765 A1 | 11/2016 | O'Connor et al. | |
| 2017/0199378 A1 | 7/2017 | Kawana | |
| 2017/0261746 A1* | 9/2017 | Tam | G06T 19/006 |
| 2018/0124364 A1* | 5/2018 | Yata | H04N 9/3179 |
| 2018/0188529 A1 | 7/2018 | Sato et al. | |
| 2018/0314065 A1 | 11/2018 | Li | |
| 2018/0348512 A1* | 12/2018 | Chiba | G02B 27/48 |
| 2020/0380900 A1* | 12/2020 | Inamoto | H04N 9/3135 |

FOREIGN PATENT DOCUMENTS

| | | |
|---|---|---|
| CN | 105044910 A | 11/2015 |
| CN | 106896506 A | 6/2017 |
| CN | 106959512 A | 7/2017 |
| CN | 107710049 A | 2/2018 |
| CN | 108490616 A | 9/2018 |
| EP | 2894509 A1 | 7/2015 |

OTHER PUBLICATIONS

First Chinese Office Action dated May 15, 2019, for corresponding Chinese Application No. 201810293673.9.

* cited by examiner

DISPLAY DEVICE AND DISPLAY CONTROL METHOD

CROSS-REFERENCE TO RELATED APPLICATION(S)

This application is a Section 371 National Stage Application of International Application No. PCT/CN2019/070199, filed on Jan. 3, 2019, entitled "HEAD-UP DISPLAY AND DISPLAY CONTROL METHOD", which has not been published yet, which claims priority to Chinese Patent Application Invention No. 201810293673.9 filed on Apr. 3, 2018 in the China National Intellectual Property Administration, the whole disclosure of which is incorporated herein by reference.

BACKGROUND

Field

Embodiments of the present disclosure generally relate to the technical field of image display, and in particular, to a display device and a display control method.

Description of the Related Art

In order to enhance both comfort and safety in modern vehicles, more and more vehicles are equipped with head-up displays (HUDs) which function as on-board display device. Typically, UHDs may image traffic information, which is displayed on small-scale display screen (typically has a diagonal size of 1.8 inch or 3.1 inch) installed on a center console of the vehicle, by a reflective imaging system, into virtual images which are presented in a floating manner above a bonnet in front of a driver being seated within a vehicle cab. Since it is unnecessary for the driver to lower his/her head or to refocus his/her eyes so as to observe significant traffic information from these virtual images, then, the driver can keep his/her sight line concentrating on road surface, facilitating enhancement of driving security. With a development in this connection, there gradually appear UHDs which can implement double-layer display functionality, which means that the virtual images floating above the bonnet comprise two types of projections, comprising: a status projection (e.g., being embodied as suspended subtitles presented in a floating manner on a background, and thus is referred to as 'proximal projection') displaying the traffic information and an Augmented Reality (AR) projection displaying driving assistance information (e.g., being embodied as the background, and thus is referred to as 'distant projection'), both projections having different projection distances, respectively.

SUMMARY

The embodiments of the present disclosure have been made to overcome or alleviate at least one aspect of the above mentioned disadvantages and/or shortcomings in the prior art, by providing a display device and a display control method in embodiments of the disclosure.

Following technical solutions are adopted in exemplary embodiments of the disclosure.

According to one aspect of embodiments of the disclosure, there is provided display device, comprising: a reflective screen; and a display assembly; and a relay optical device; the display assembly comprising: a light source, configured to emit light beams; a light modulator provided in a direction of propagation of the light beams and a reflective display located downstream the light modulator in an optical path of the display device, the light modulator being configured to modulate the light beams alternately in timing sequence at two deflection angles different from each other respectively in such a manner that the light beams travel through the light modulator and then generate alternately in timing sequence a first light beam which is incident on the reflective display in a first direction and a second light beam which is incident on the reflective display in a second direction different from the first direction, and the reflective display being configured to generate a first image in response to the first light beam being incident on the reflective display in the first direction and to generate a second image in response to the second light beam being incident on the reflective display in the second direction; and the relay optical device is located downstream the reflective display in the optical path of the display device and configured to project the first light beam carried with the first image and the second light beam carried with the second image onto two positions on the reflective screen different from each other respectively in such way that virtual images of the first image and the second image are generated respectively at different distances from the reflective screen, at a side of reflective screen opposite to a side from which the virtual images are observed.

According to embodiments of the disclosure, the light modulator is a spatial light modulator.

According to embodiments of the disclosure, the spatial light modulator comprises one of following:

a DKDP device utilizing Pockels' effect, a PROM device utilizing Pockels' effect, a liquid crystal light valve utilizing hybrid field effect, or a thermoplastic recording medium utilizing surface deformation or a photoconductive thermoplastic recording medium.

According to embodiments of the disclosure, the reflective display is one of following: a DLP display or an LCOS display.

According to embodiments of the disclosure, the relay optical device comprises: a first mirror; and a combined concave mirror located downstream the first mirror and comprising: a first concave mirror, which is arranged in an optical path of the first light beam carried with the first image and reflected by the first mirror, and is configured to image the first light beam by reflection; and a second concave mirror, which is combined with the first concave mirror by abutting against each other, and is arranged in an optical path of the second light beam carried with the second image and reflected by the first mirror, and is configured to image the second light beam by reflection.

According to embodiments of the disclosure, the first concave mirror and the second concave mirror are concave towards one and the same side.

According to embodiments of the disclosure, the first concave mirror and the second concave mirror form the combined concave mirror collectively, by being provided side by side on one and the same virtual curved surface.

According to embodiments of the disclosure, the one and the same virtual curved surface is a continuous portion of a virtual curved surface located on one and the same virtual spherical surface.

According to embodiments of the disclosure, the first concave mirror and the second concave mirror have different focal lengths.

According to embodiments of the disclosure, the relay optical device comprises a second mirror, a third concave mirror and a fourth concave mirror, the third concave mirror is configured to directly image the first light beam carried with the first image and reflected by the reflective display to the reflective screen by reflection, and the fourth concave mirror is configured to image the second light beam carried with the second image and reflected sequentially by the reflective display and the second mirror to the reflective screen by reflection.

According to embodiments of the disclosure, the reflective screen is a partially reflecting mirror.

According to embodiments of the disclosure, the partially reflecting mirror is a windshield glass of a vehicle.

According to embodiments of the disclosure, the light source comprises a laser which is configured to generate the light beams.

According to embodiments of the disclosure, the display device further comprises a controller which is arranged to electrically connect with the laser, the light modulator and the reflective display respectively, and is configured to transmit light-emitting control information which controls laser luminescent timing sequence to the laser and also configured to transmit display control information which controls the first image and the second image to be displayed alternately in timing sequence to the reflective display, as well as configured to transmit modulation control information which mates with preformed image information to the light modulator simultaneously.

According to another aspect of the exemplary embodiment of the present disclosure, there is provided a display control method, which is applied in the display device as above and comprising: controlling the luminescent timing sequence of the light source; controlling the reflective display to display alternately in timing sequence the first image and the second image, the timing sequence in which the first image and the second image are displayed alternately mating with the luminescent timing sequence; and controlling the light modulator to modulate the light beams emitted by the light source to form the first light beam carried with the first image and the second light beam carried with the second image respectively, depending on the modulation control information respectively mating with the first image and the second image which are pre-displayed by the reflective display alternately in timing sequence.

According to embodiments of the disclosure, the timing sequence in which the first image and the second image are displayed alternately and the luminescent timing sequence are synchronous with each other.

According to embodiments of the disclosure, the light source comprises a red light laser, a green light laser and a blue light laser, and the luminescent timing sequence for controlling the light source comprises: a first display period in which the reflective display is controlled to display the first image and the light source is controlled in a time-division manner to emit a first group of laser beams of three-colors comprising red, green and blue in such a way that the first light beam carried with the first image is formed collectively by the first group of laser beams of three-colors; and a second display period in which the reflective display is controlled to display the second image and the light source is controlled in a time-division manner to emit a second group of laser beams of three-colors comprising red, green and blue in such a way that the second light beam carried with the second image is formed collectively by the second group of laser beams of three-colors.

According to embodiments of the disclosure, the step of "controlling the light modulator to modulate the light beams emitted by the light source to form the first light beam carried with the first image and the second light beam carried with the second image respectively, depending on the modulation control information respectively mating with the first image and the second image which are pre-displayed by the reflective display alternately in timing sequence" comprises: the light modulator is controlled to modulate in a time-division manner the first group of laser beams of three-colors comprising red, green and blue respectively in the first display period in which the reflective display is controlled to display the first image, in such a way that the modulated first group of laser beams of three-colors comprising red, green and blue propagate in one and the same first direction of propagation to form collectively the first light beam carried with the first image; and the light modulator is controlled to modulate in a time-division manner the second group of laser beams of three-colors comprising red, green and blue respectively in the second display period in which the reflective display is controlled to display the second image, in such a way that the modulated second group of laser beams of three-colors comprising red, green and blue propagate in one and the same second direction of propagation to form collectively the second light beam carried with the second image, the second direction of propagation being different from the first direction of propagation.

According to embodiments of the disclosure, the step of "the light modulator is controlled to modulate in a time-division manner the first group of laser beams of three-colors comprising red, green and blue respectively in the first display period in which the reflective display is controlled to display the first image" comprises: controlling the light modulator to modulate a first group of laser beams of red contained in the first group of laser beams of three-colors comprising red, green and blue with a fourth modulation signal d1R, during a time period in which the light source is controlled to emit the first group of laser beams of red; controlling the light modulator to modulate a first group of laser beams of green contained in the first group of laser beams of three-colors comprising red, green and blue with a second modulation signal d1G, during a time period in which the light source is controlled to emit the first group of laser beams of green; and controlling the light modulator to modulate a first group of laser beams of blue contained in the first group of laser beams of three-colors comprising red, green and blue with a third modulation signal d1B, during a time period in which the light source is controlled to emit the first group of laser beams of blue.

According to embodiments of the disclosure, the step of "the light modulator is controlled to modulate in a time-division manner the second group of laser beams of three-colors comprising red, green and blue respectively in the second display period in which the reflective display is controlled to display the second image" comprises: controlling the light modulator to modulate a second group of laser beams of red contained in the second group of laser beams of three-colors comprising red, green and blue with a fourth modulation signal d2R, during a time period in which the light source is controlled to emit the second group of laser beams of red; controlling the light modulator to modulate a second group of laser beams of green contained in the second group of laser beams of three-colors comprising red, green and blue with a fifth modulation signal d2G, during a time period in which the light source is controlled to emit the second group of laser beams of green; and controlling the light modulator to modulate a second group of laser beams of blue contained in the second group of laser beams of three-colors comprising red, green and blue with a sixth modulation signal d2B, during a time period in which the light source is controlled to emit the second group of laser beams of blue.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION

Figure 1:
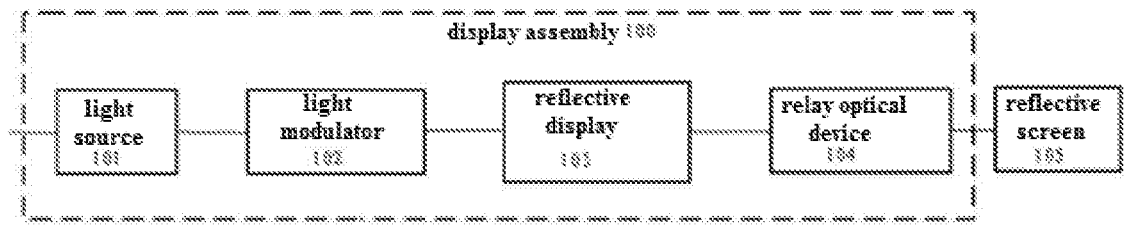
FIG. 1 illustrates a structural schematic block diagram of a display device according to exemplary embodiments of the disclosure.

Technical solutions of the disclosure will further be described in detail below in embodiments thereof, with reference to the accompanying drawings. In the specification and the drawings, the same or similar reference numerals are used to refer to the same or similar components or members. It is to be understood that the following description of the embodiments with reference to the accompanying drawings is intended to be illustrative of general inventive concept of the disclosure, rather than a limitation of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of a display device according to embodiments of the disclosure.

A relevant display device for implementing a double-layer display functionality is complex in structure. For example, two different images are generated respectively by using two individual image sources and then are carried by two light beams to propagate through two individual optical paths and in turn the two light beams are reflected by a windshield glass and a combiner so as to form two images having different depths of field. The combiner may for example be an individual thin glass sheet/plate or an individual perspex sheet/plate, either being provided independently from the windshield glass. Such a relevant solution may implement the double-layer display functionality, but two independent image sources and the combiner which is additionally provided are required.

According to a general inventive concept of embodiments of the disclosure, in an aspect of embodiments of the disclosure, referring to FIG. 1, it illustrates a schematic structural block diagram of a display device according to exemplary embodiments of the disclosure. As illustrated, a display device is provided, comprising a display assembly 100 and a reflective screen 105, the display assembly comprising: a light source 101 configured to emit light beams; a light modulator 102 provided in a direction of propagation of the light beams and a reflective display 103 located downstream the light modulator 102 in an optical path of the display device, the light modulator being configured to modulate the light beams alternately in timing sequence at two deflection angles different from each other respectively in such a manner that the light beams travel through the light modulator and then generate alternately in timing sequence a first light beam which is incident on the reflective display 103 in a first direction and a second light beam which is incident on the reflective display 103 in a second direction different from the first direction, and the reflective display 103 being configured to generate a first image in response to the first light beam being incident on the reflective display in the first direction and to generate a second image in response to the second light beam being incident on the reflective display in the second direction; and a relay optical device 104, which is located downstream the reflective display in the optical path of the display device and configured to project the first light beam carried with the first image and the second light beam carried with the second image onto two positions of the reflective screen different from each other respectively in such way that virtual images of the first image and the second image are generated respectively at different distances from the reflective screen, at a side of reflective screen opposite to a side from which the virtual images are observed.

In addition, in some embodiments, the reflective screen 105 is arranged downstream the relay optical device 104, and is configured to reflect the first image and the second image towards eyes of an observer respectively for being received by the eyes, so as to facilitate that the observer may observe two independent images.

In some embodiments, the light source 101 of the display device, for example comprises a laser. It can be understood that, a laser beam being projected onto the light modulator 102 may for example be a light beam emitted by the light source 101. On an occasion where a colored display is required, the light source 101 for example comprises three mono-color lasers: a red laser, a green laser and a blue laser which emit respective light beams in a time-division (i.e., time-sharing) manner for being incident on the light modulator 102 respectively.

In some embodiments, the light modulator is for example a spatial light modulator, e.g., comprising one of following: a DKDP (i.e., Potassium Dideuterium Phosphate) device utilizing Pockels' effect, a PROM (i.e., Pockels' readout optical modulator) device utilizing Pockels' effect, a liquid crystal light valve utilizing hybrid field effect, or a thermoplastic recording medium utilizing surface deformation or a photoconductive thermoplastic recording medium, or the like.

In some embodiments, for example, the reflective display 103 is one of following: a DLP (Digital Light Processing) display or an LCOS (Liquid Crystal ON Silicon) display.

Figure 2:
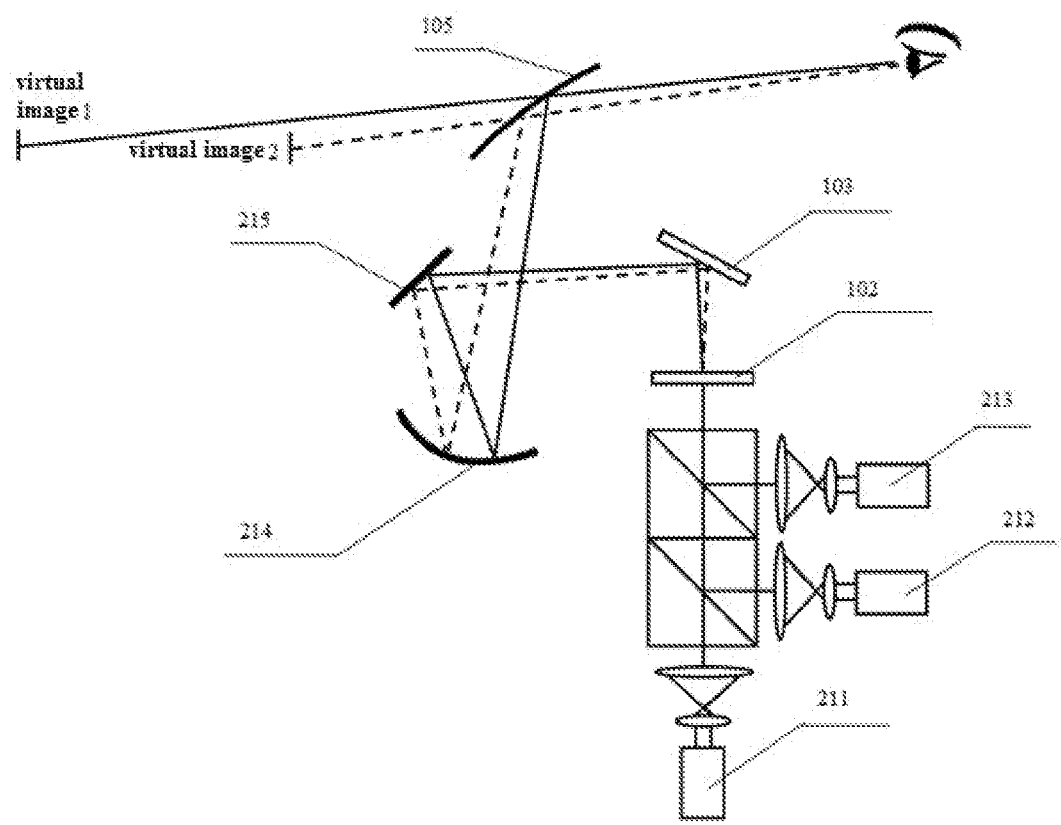
FIG. 2 illustrates a schematic optical path diagram of the display device according to exemplary embodiments of the disclosure.
Figure 3:
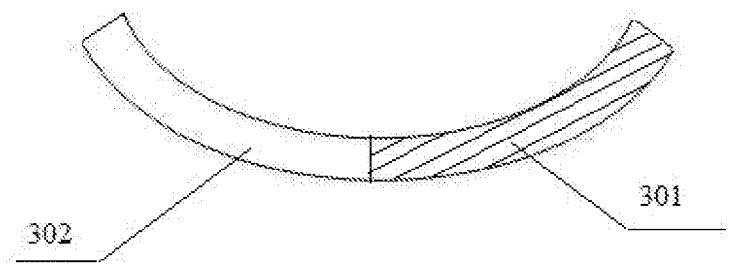
FIG. 3 illustrates a structural schematic view of a combined concave mirror according to exemplary embodiments of the disclosure.

Then, referring to FIG. 2 and FIG. 3, FIG. 2 illustrates a schematic optical path diagram of the display device according to exemplary embodiments of the disclosure and FIG. 3 illustrates a structural schematic view of a combined concave mirror according to exemplary embodiments of the disclosure. As illustrated, the relay optical device 104 for example as shown in FIG. 2 comprises a first mirror 215 and a combined concave mirror 214 located downstream the first mirror 215, i.e., the first mirror 215 is located between the reflective display 103 and the combined concave mirror 214, and the combined concave mirror for example comprises a first concave mirror 301 and a second concave mirror 302 which are combined together by abutting against each other as illustrated in FIG. 3 (e.g., being formed integrally as illustrated), and the first concave mirror 301 and the second concave mirror 302 are for example concave towards one and the same side as illustrated; the first concave mirror 301 is arranged in an optical path of the first light beam carried with the first image and reflected by the first mirror 215, and is configured to image the first light beam by reflection; and the second concave mirror 302 is combined with the first concave mirror by abutting against each other, and is arranged in an optical path of the second light beam carried with the second image and reflected by the first mirror 215, and is configured to image the second light beam by reflection.

As illustrated in FIG. 2, for example, a red laser beam emitted by a red laser 211, a green laser beam emitted by a green laser 212, and a blue laser beam emitted by a blue laser 213 are incident onto the light modulator 102 respectively, the light modulator 102 is in the form of a spatial light modulator (abbreviated as SLM) which generates a grating structure through which a laser beam being incident thereon may be diffracted; and by controlling modulation signals being applied on the SLM, the red laser beam, the green laser beam and the blue laser beam having respective three wavelengths different from one another may diffract at one and the same diffraction angle after passing through the SLM. Theses laser beams having three different wavelengths pass through the SLM and then are incident onto the reflective display 103 at one and the same angle to form the first light beam carried with the first image, and the first light beam thus generated and carried with the first image may then pass through the first concave mirror 301 within the combined concave mirror 214 to image, and in turn to form a virtual image 1 through the reflective screen 105, with its optical path being shown by mark 'd' as illustrated.

In embodiments of the disclosure, in order to form two independent images, for example, the modulation signals of the SLM may be adjusted in a time-division manner, in such a way that the red laser beam, the green laser beam and the blue laser beam having respective three wavelengths may pass through the SLM and then are diffracted at another angle, and display contents of display components are simultaneously adjusted, so as to form the second light beam carried with the second image and propagating in a different direction. The second light beam carried with the second image is incident on the second concave mirror 302 within the combined concave mirror 214 to image, and in turn to form a virtual image 2 through the reflective screen 105, with its optical path being shown in dotted line as illustrated.

In some embodiments, e.g., as illustrated in FIG. 3, the first concave mirror 301 and the second concave mirror 302 are provided side by side on one and the same virtual curved surface (e.g., a continuous portion of a virtual curved surface located on one and the same virtual spherical surface), and thus form the combined concave mirror 214 collectively.

In some embodiments, the first concave mirror 301 and the second concave mirror 302 for example have different focal lengths. Due to difference in focal lengths of the first concave mirror 301 and the second concave mirror 302, therefore, image distances of two virtual images thus formed are different, i.e., as for the observer, these two virtual images have different depth of fields. By way of example, as illustrated in FIG. 2 (and FIG. 4 as mentioned hereinafter), the depth of field of the virtual image 1 is larger than that of the virtual image 2. And for example, each of the first concave mirror 301 and the second concave mirror 302 may be a free-form curved mirror.

Figure 4:
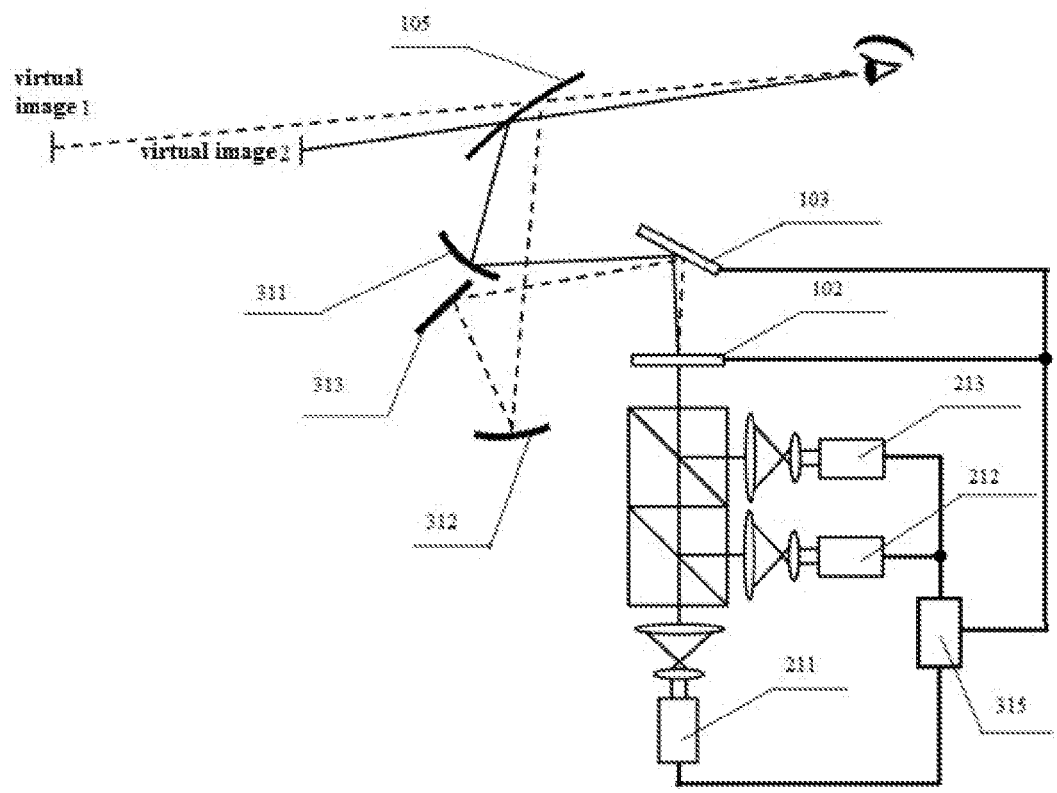
FIG. 4 illustrates a schematic optical path diagram of a display device according to other exemplary embodiments of the disclosure.

Referring to FIG. 4, it illustrates a schematic optical path diagram of a display device according to other exemplary embodiments of the disclosure. As illustrated, the relay optical device 104 comprises a second mirror 313, a third concave mirror 311 and a fourth concave mirror 312, the third concave mirror 311 is configured to directly image the first light beam carried with the first image and reflected by the reflective display 103 to the reflective screen 105 by reflection, and the fourth concave mirror 312 is configured to image the second light beam carried with the second image and reflected sequentially by the reflective display 103 and the second mirror 313 to the reflective screen 105 by reflection.'

As to embodiments as illustrated in FIG. 4, there exists a difference thereof as compared with embodiments shown in FIG. 2, lying in that, the relay optical device in embodiments as illustrated in FIG. 4 uses two independent concave mirrors to reflect the first light beam carried with the first image and the second light beam carried with the second image, respectively, in such a way that respective optical paths of the first light beam and the second light beam are separated from each other more apparently. A light beam carried with an image is projected by the reflective display 103 and is then directly imaged through the third concave mirror 311 and in turn directly pass through the reflective screen 105 to form a virtual image 2, as shown in solid line as illustrated. And another light beam carried with another image is projected by the reflective display 103 and is then reflected by the second mirror 313 additionally provided, and is then imaged by the fourth concave mirror 312 and in turn reflected by the reflective screen 105 to form a virtual image 1, as shown in dotted line as illustrated. Thereby, it essentially forms folded optical paths with respective mirror (s), facilitating increase of object distance. In embodiments of the disclosure, by using the folded optical paths with respective mirror(s) to increase respective object distances, then different image distances can be obtained, so as to form images having different depths of field.

In embodiments of the disclosure, the focal lengths of the third concave mirror and the fourth concave mirror can be adjusted as per practical requirements; and the third concave mirror and the fourth concave mirror may for example have one and the same focal length, or different focal lengths.

In some embodiments, the reflective screen 105 is for example a partially reflecting mirror, more specifically, for example a windshield glass of a vehicle. In the embodiments, the observer is able to observe two independent images which are formed by clear projections of light beams at different locations at different distances from and in front of the windshield glass of the vehicle, and respective optical paths of light beams carried with two images respectively may not interfere with each other.

In some embodiments, the display device for example further comprise a controller 315, which is for example a control circuit and is arranged to electrically connect with the laser, the light modulator 102 and the reflective screen 103 respectively, and is configured to transmit light-emitting control information which controls laser luminescent timing sequence to the laser and also configured to transmit display control information which controls the first image and the second image to be displayed alternately in timing sequence to the reflective display 103, as well as configured to transmit modulation control information which mates with displayed image(s) to the light modulator 102 simultaneously. In the embodiments, the laser for example comprises the red laser 211, the green laser 212 and the blue laser 213 which have three wavelengths respectively, so as to form colored images by mixing three mono-color lasers comprising red laser beam, green laser beam and blue laser beam emitted by the red laser 211, the green laser 212 and the blue laser 213 respectively. The luminescent timing sequence is an objective switching timing sequence among light beams depending on images to be formed, and respective luminescent timing sequence of these three lasers are set individually. It can be understood that, in FIG. 4, a specific controlling way in which the controller, the laser, the light modulator 102 and the reflective display 103 are connected with one another may also be applicable to the display device as illustrated in FIG. 2, without being repeated any more.

In another aspect of embodiments of the disclosure, there is further provided a display control method, which is applied in the display device according to embodiments of the disclosure.

Figure 5:
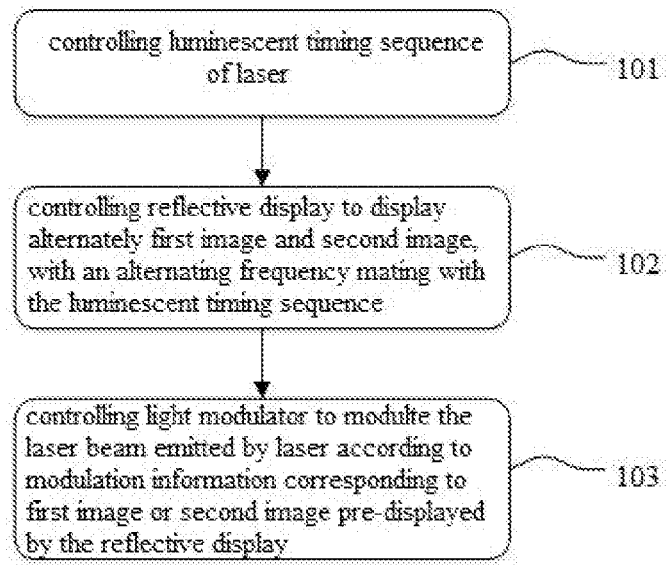
FIG. 5 illustrates a schematic flow chart of a display control method according to exemplary embodiments of the disclosure.

Referring to FIG. 5, it illustrates a schematic flow chart of a display control method according to exemplary embodiments of the disclosure. The method comprises:

Step S101: controlling the luminescent timing sequence of the light source;

Step S102: controlling the reflective display to display alternately in timing sequence the first image and the second image, the timing sequence in which the first image and the second image are displayed alternately mating with (e.g., synchronous with) the luminescent timing sequence; and Step S103: controlling the light modulator to modulate the light beams emitted by the light source to form the first light beam carried with the first image and the second light beam carried with the second image respectively, depending on the modulation control information respectively mating with the first image and the second image which are pre-formed by the reflective display alternately in timing sequence.

Figure 6:
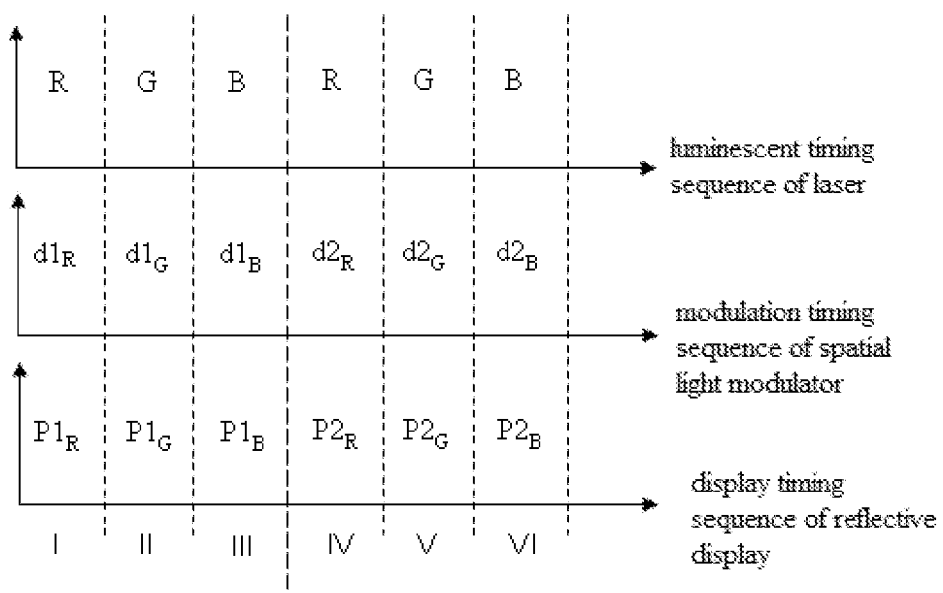
FIG. 6 illustrates a schematic timing sequence diagram of luminescence, modulation and display in the display control method according to exemplary embodiments of the disclosure.

Referring to FIG. 6, it illustrates a schematic timing sequence diagram of luminescence, modulation and display in the display control method according to exemplary embodiments of the disclosure. As illustrated in FIG. 6, a whole display cycle comprises two time periods, i.e., a first display period for displaying the first image and a second display period for displaying the second image. And each of the first display period and the second display period comprises three types of moments, respectively; then, display moments for presenting red component correspond to moment I and moment IV, respectively, display moments for presenting green component correspond to moment II and moment V, respectively, and display moments for presenting blue component correspond to moment III and moment VI, respectively. Specifically, for example as illustrated in FIG. 6, provided that moments I, II and III form collectively the first display period for displaying the first image and moments IV, V and VI form collectively the second display period for displaying the second image, then, in the first display period for displaying the first image, the display moment for presenting red component (R) is moment I, the display moment for presenting green component (G) is moment II, and the display moment for presenting blue component (B) is moment III, and in the second display period for displaying the second image, the display moment for presenting red component (R) is moment IV, the display moment for presenting green component (G) is moment V, and the display moment for presenting blue component (B) is moment VI.

During implementation of display control, respective timing sequences for three links of luminescence, modulation and display should be coordinated with one another, so as to implement a purpose of double-layer display functionality according to embodiments of the disclosure. Therefore, timing sequences specifically comprise three groups of timing sequences, i.e., a luminescent timing sequence of the light source (laser(s)), a modulation timing sequence of the spatial light modulator and a display timing sequence of the reflective display, specifically being interpreted as follows:

Moment I: the red laser emits light (red laser beam) but the green laser and the blue laser are turned off; and the spatial light modulator receives a first modulation signal $d1_R$ and deflects the red laser beam at a first angle so as to project the deflected read laser beam to the reflective display; and the reflective display in turn displays a red component of the first image.

Moment II: the green laser emits light (green laser beam) but the red laser and the blue laser are turned off; and the spatial light modulator receives a second modulation signal $d1_G$ and deflects the green laser beam at a first angle so as to project the deflected green laser beam to the reflective display; and the reflective display in turn displays a green component of the first image.

Moment III: the blue laser emits light (blue laser beam) but the red laser and the green laser are turned off; and the spatial light modulator receives a third modulation signal $d1_B$ and deflects the blue laser beam at a first angle so as to project the deflected blue laser beam to the reflective display; and the reflective display in turn displays a blue component of the first image.

Moment IV: the red laser emits light (red laser beam) once again but the green laser and the blue laser are turned off; and the spatial light modulator receives a fourth modulation signal $d2_R$ and deflects the red laser beam at a second angle so as to project the deflected red laser beam to the reflective display; and the reflective display in turn displays a red component of the second image.

Moment V: the green laser emits light (green laser beam) once again but the red laser and the blue laser are turned off; and the spatial light modulator receives a fifth modulation signal $d2G$ and deflects the green laser beam at a second angle so as to project the deflected green laser beam to the reflective display; and the reflective display in turn displays a green component of the second image.

Moment VI: the blue laser emits light (blue laser beam) once again but the red laser and the green laser are turned off; and the spatial light modulator receives a sixth modulation signal $d2_B$ and deflects the blue laser beam at a second angle so as to project the deflected blue laser beam to the reflective display; and the reflective display in turn displays a blue component of the second image.

To sum up, in other words, the red laser beam, the green laser beam and the blue laser beam which are deflected at the first angle cooperate with one another to form collectively the first light beam carried with the first image; and the red laser beam, the green laser beam and the blue laser bream which are deflected at the second angle cooperate with one another to form collectively the second light beam carried with the second image.

Furthermore, a control signal for example comprises a grating periodic signal; and in order to implement a deflection of laser beams having different wavelengths at one and the same angle, it is required to provide grating periods mating with these laser beams having different wavelengths, respectively. Therefore, by way of example, in order to implement that the red laser beam, the green laser beam and the blue laser beam are all deflected at the first angle so as to cooperate with one another to form collectively the first light beam carried with the first image, then it is required that control signals $d1_R$, $d1_G$, $d1_B$ containing respective grating periodic signals different from one another are used for control, respectively. In addition, mated display frequency is higher than a response frequency of human eyes. Due to effect of persistence of vision, then the first image and the second image, both of which are colored, can be observed simultaneously by human eyes.

As compared with relevant art, embodiments of the disclosure at least have advantages and beneficial technical effects as below:

According to technical solutions provided in embodiments of the disclosure, the light modulator divides the light beam emitted by the light source into two light beams propagating in two different paths and in turn projects them onto the reflective display to generate two images respectively, and then, these two images mate with subsequent relay optical device so as to implement the double-layer display effect, facilitating solving problems of relatively high cost and relatively complex structure brought about by two image sources as adopted in relevant art.

The flowchart and block diagrams in the accompanying drawings illustrate any possible architecture(s), function(s) and operation(s) of systems, methods and computer program products in accordance with various embodiments of the present disclosure. In this regard, each box in the flowcharts or block diagrams may represent a module, a program segment, or a portion of a code that contains one or more executable instructions for implementing a specified logical function. It should also be noted that in some alternative implementations, the functions labeled in the boxes may also occur in another order different from those labeled in the drawings. For example, two contiguous boxes can actually be executed essentially side by side, and they can sometimes be executed in a reverse order, depending on the function involved. It should also be noted that each block in the block diagrams and/or flow chart, and the combination of blocks in the block diagrams and/or flow chart, can be implemented by a dedicated hardware-based system that performs specified functions or operations, or by a combination of dedicated hardware and computer instructions.

Above depictions are merely descriptions and interpretations of exemplary embodiments of the disclosure and employed technical principles. It should be understood by those skilled in the art that the scope of invention in the embodiments of the disclosure should cover other technical solutions formed by arbitrary combination(s) of the above-mentioned technical features or their equivalent features without departing from the inventive concept, rather than being limited to a technical solution formed by a specific combination of the above-mentioned technical features. For example, the above features are replaced with the technical features disclosed in the embodiments of the present disclosure which have similar functions, but not limited hereto.

What is claimed is:

1. A display device, comprising:
    a reflective screen; and
    a display assembly, comprising:
        a light source, configured to emit light beams;
        a light modulator provided in a direction of propagation of the light beams and a reflective display located downstream the light modulator in an optical path of the display device, the light modulator being configured to modulate the light beams alternately in timing sequence at two deflection angles different from each other respectively in such a manner that the light beams travel through the light modulator and then generate alternately in timing sequence a first light beam which is incident on the reflective display in a first direction and a second light beam which is incident on the reflective display in a second direction different from the first direction, and the reflective display being configured to generate a first image in response to the first light beam being incident on the reflective display in the first direction and to generate a second image in response to the second light beam being incident on the reflective display in the second direction; and
        a relay optical device, which is located downstream the reflective display in the optical path of the display device and configured to project the first light beam carried with the first image and the second light beam carried with the second image onto two positions on the reflective screen different from each other respectively in such way that virtual images of the first image and the second image are generated respectively at different distances from the reflective screen, at a side of reflective screen opposite to a side from which the virtual images are observed.

2. The display device according to claim 1, wherein the light modulator is a spatial light modulator.

3. The display device according to claim 2, wherein the spatial light modulator comprises one of following:
    a DKDP device utilizing Pockels' effect, a PROM device utilizing Pockels' effect, a liquid crystal light valve utilizing hybrid field effect, or a thermoplastic recording medium utilizing surface deformation or a photoconductive thermoplastic recording medium.

4. The display device according to claim 1, wherein the reflective display is one of following: a DLP display or an LCOS display.

5. The display device according to claim 1, wherein the relay optical device comprises:
    a first mirror; and
    a combined concave mirror located downstream the first mirror and comprising:
        a first concave mirror, which is arranged in an optical path of the first light beam carried with the first image and reflected by the first mirror, and is configured to image the first light beam by reflection; and
        a second concave mirror, which is combined with the first concave mirror by abutting against each other, and is arranged in an optical path of the second light beam carried with the second image and reflected by the first mirror, and is configured to image the second light beam by reflection.

6. The display device according to claim 5, wherein the first concave mirror and the second concave mirror are concave towards one and the same side.

7. The display device according to claim 6, wherein the first concave mirror and the second concave mirror form the combined concave mirror collectively, by being provided side by side on one and the same virtual curved surface.

8. The display device according to claim 7, wherein the one and the same virtual curved surface is a continuous portion of a virtual curved surface located on one and the same virtual spherical surface.

9. The display device according to claim 7, wherein the first concave mirror and the second concave mirror have different focal lengths.

10. The display device according to claim 1, wherein the relay optical device comprises a second mirror, a third concave mirror and a fourth concave mirror, the third concave mirror is configured to directly image the first light beam carried with the first image and reflected by the reflective display to the reflective screen by reflection, and the fourth concave mirror is configured to image the second light beam carried with the second image and reflected sequentially by the reflective display and the second mirror to the reflective screen by reflection.

11. The display device according to claim 1, wherein the reflective screen is a partially reflecting mirror.

12. The display device according to claim 11, wherein the partially reflecting mirror is a windshield glass of a vehicle.

13. The display device according to claim 12, wherein the light source comprises a laser which is configured to generate the light beams.

14. The display device according to claim 13, further comprising a controller which is arranged to electrically connect with the laser, the light modulator and the reflective display respectively, and is configured to transmit light-emitting control information which controls laser luminescent timing sequence to the laser and also configured to transmit display control information which controls the first image and the second image to be displayed alternately in timing sequence to the reflective display, as well as configured to transmit modulation control information which mates with preformed image information to the light modulator simultaneously.

15. A display control method, which is applied in the display device according to claim 1 and comprising:
controlling the luminescent timing sequence of the light source;
controlling the reflective display to display alternately in timing sequence the first image and the second image, the timing sequence in which the first image and the second image are displayed alternately mating with the luminescent timing sequence; and
controlling the light modulator to modulate the light beams emitted by the light source to form the first light beam carried with the first image and the second light beam carried with the second image respectively, depending on the modulation control information respectively mating with the first image and the second image which are pre-displayed by the reflective display alternately in timing sequence.

16. The display control method according to claim 15, wherein the timing sequence in which the first image and the second image are displayed alternately and the luminescent timing sequence are synchronous with each other.

17. The display control method according to claim 15, wherein the light source comprises a red light laser, a green light laser and a blue light laser, and the luminescent timing sequence for controlling the light source comprises:
a first display period in which the reflective display is controlled to display the first image and the light source is controlled in a time-division manner to emit a first group of laser beams of three-colors comprising red, green and blue in such a way that the first light beam carried with the first image is formed collectively by the first group of laser beams of three-colors; and
a second display period in which the reflective display is controlled to display the second image and the light source is controlled in a time-division manner to emit a second group of laser beams of three-colors comprising red, green and blue in such a way that the second light beam carried with the second image is formed collectively by the second group of laser beams of three-colors.

18. The display control method according to claim 15, wherein the step of: controlling the light modulator to modulate the light beams emitted by the light source to form the first light beam carried with the first image and the second light beam carried with the second image respectively, depending on the modulation control information mating with the first image and the second image which are pre-displayed by the reflective display alternately in timing sequence comprises:
the light modulator is controlled to modulate in a time-division manner the first group of laser beams of three-colors comprising red, green and blue respectively in the first display period in which the reflective display is controlled to display the first image, in such a way that the modulated first group of laser beams of three-colors comprising red, green and blue propagate in one and the same first direction of propagation to form collectively the first light beam carried with the first image; and
the light modulator is controlled to modulate in a time-division manner the second group of laser beams of three-colors comprising red, green and blue respectively in the second display period in which the reflective display is controlled to display the second image, in such a way that the modulated second group of laser beams of three-colors comprising red, green and blue propagate in one and the same second direction of propagation to form collectively the second light beam carried with the second image, the second direction of propagation being different from the first direction of propagation.

19. The display control method according to claim 18, wherein the step of: the light modulator is controlled to modulate in a time-division manner the first group of laser beams of three-colors comprising red, green and blue respectively in the first display period in which the reflective display is controlled to display the first image, comprises:
controlling the light modulator to modulate a first group of laser beams of red contained in the first of laser beams of three-colors comprising red, green and blue with a first modulation signal, during a time period in which the light source is controlled to emit the first group of laser beams of red;
controlling the light modulator to modulate a first group of laser beams of green contained in the first group of laser beams of three-colors comprising red, green and blue with a second modulation signal, during a time period in which the light source is controlled to emit the first group of laser beams of green; and
controlling the light modulator to modulate a first group of laser beams of blue contained in the first group of laser beams of three-colors comprising red, green and blue with a third modulation signal, during a time period in which the light source is controlled to emit the first group of laser beams of blue.

20. The display control method according to claim 18, wherein the step of: the light modulator is controlled to modulate in a time-division manner the second group of laser beams of three-colors comprising red, green and blue respectively in the second display period in which the reflective display is controlled to display the second image, comprises:

controlling the light modulator to modulate a second group of laser beams of red contained in the second group of laser beams of three-colors comprising red, green and blue with a fourth modulation signal, during a time period in which the light source is controlled to emit the second group of laser beams of red;

controlling the light modulator to modulate a second group of laser beams of green contained in the second group of laser beams of three-colors comprising red, green and blue with a fifth modulation signal, during a time period in which the light source is controlled to emit the second group of laser beams of green; and controlling the light modulator to modulate a second group of laser beams of blue contained in the second group of laser beams of three-colors comprising red, green and blue with a sixth modulation signal, during a time period in which the light source is controlled to emit the second group of laser beams of blue.

* * * * *